(12) United States Patent
Chang et al.

(10) Patent No.: US 6,426,710 B1
(45) Date of Patent: Jul. 30, 2002

(54) SECURITY KEYBOARD MATRIX SCANNING METHOD

(75) Inventors: Edmund Yeng-Ming Chang; Steve W. S. Teng, both of Taipei (TW)

(73) Assignee: XAC Automation Corp. (TW)

( * ) Notice: Subject to any disclaimer, the term of this patent is extended or adjusted under 35 U.S.C. 154(b) by 0 days.

(21) Appl. No.: 09/304,511

(22) Filed: May 3, 1999

(30) Foreign Application Priority Data

Dec. 17, 1998 (CN) ........................................ 87121045 A

(51) Int. Cl.[7] .............................................. H03M 11/00
(52) U.S. Cl. ........................................ 341/26; 340/14.1
(58) Field of Search ................... 341/26, 22; 379/368; 380/52, 46, 44; 340/14.1

(56) References Cited

U.S. PATENT DOCUMENTS

| | | | | |
|---|---|---|---|---|
| 4,926,173 A | * | 5/1990 | Frielink | 341/22 |
| 5,025,255 A | * | 6/1991 | Mould | 341/26 |
| 5,254,989 A | * | 10/1993 | Verrier et al. | 341/26 |
| 5,554,985 A | * | 9/1996 | Chang | 341/26 |
| 5,677,687 A | * | 10/1997 | Valdenaire | 341/26 |
| 5,832,206 A | * | 11/1998 | De Jesus et al. | 341/26 |
| 5,933,102 A | * | 8/1999 | Miller et al. | 341/26 |
| 6,054,940 A | * | 4/2000 | Greene | 341/26 |

* cited by examiner

*Primary Examiner*—Michael Horabik
*Assistant Examiner*—Albert K. Wong
(74) *Attorney, Agent, or Firm*—Blakely Sokoloff Taylor & Zafman

(57) ABSTRACT

A security keyboard matrix scanning method for a keyboard is disclosed. This invention utilizes bi-directional input/output ports, in which each line of the X-port and the Y-port can be selectively designated as a sensing line or an output line, to construct the X-port and Y-port such that at least one line of one of the two ports can output a scanning signal representative of a dummy scanning signal at the time the actual scanning signal is output from another line of either port. Thus, the scanning method disclosed in this invention can efficiently prevent a password from being recognized by a third party for illegal use thereby enhancing the security of a password identification device.

7 Claims, 3 Drawing Sheets

SECURITY KEYBOARD MATRIX SCANNING METHOD

BACKGROUND OF THE INVENTION

1. Field of the Invention

The invention relates to a keyboard matrix scanning method, and in particular to a security keyboard matrix scanning method for preventing a third party from knowing password being input from the keyboard during a password identification operation.

2. Description of the Related Art

In line with the popularity of an information system for financial transaction or management information, demands for preventing a third party from inappropriately operating and illegally accessing the information system is becoming increasingly greater. At present, the most commonly used method to prevent illegal operations is to request the user to key in a password. However, as criminals become more sophisticated, they can easily obtain a user's input password by monitoring and observing the input operation, and then illegally access the information systems.

FIG. 1 is a schematic drawing illustrating a conventional keyboard matrix scanning structure for password identification. As shown in FIG. 1, scanning lines of a keyboard which respectively connects to a X-port and a Y-port are typically arranged into a matrix, such as a matrix consisting of n rows and m columns of scanning lines. Each cross point corresponds to a position that one key is located and thus there are totally nxm keys. One scanning line of each key is electrically connected to the Y-port which serves as a scanning signal output port and has totally n lines. The other scanning line of each key is electrically connected to the X-port which serves as a scanning signal input port or scanning signal sensing port and has totally m lines. When a key is pressed, an electric conduction is constructed between two corresponding lines which crosses at its corresponding position, and thus a scanning signal output from a corresponding scanning signal output line of the Y-port will be sent to a corresponding scanning signal input line of the X-port, thereby the position of the key being pressed is able to be detected.

In detail, the output scanning lines Y0~Yn of the Y-port are all at a high logic level and the input scanning lines X0~Xm of the X-port are also at a high logic level when a scanning/detection procedure is not executed. In operation, each of the output scanning lines Y0~Yn repeatedly outputs a scanning signal in sequence. That is, each of the output scanning lines Y0~Yn outputs a low logic level in sequence while the else having not been selected remain a high logic level. In the meanwhile, the X-port will detect whether any one of the input scanning lines X0~Xm is at a low logic level. If one of the input scanning lines of the X-port is at a low logic level, it indicates that one key on a line corresponding to that scanning lines has been pressed. Otherwise, scanning is continuously implemented. In other words, if a key $K_{xy}$ is pressed, a corresponding input scanning line Xx will detect a low logic level when a corresponding output scanning line Yy outputs a low logic level signal, i.e., the output scanning line Yy and the input scanning line Xx are of a low logic level while the other output and input scanning lines are of a high logic level. According to the above manner, the keys being pressed in a keyboard would be detected by the password identification device.

Moreover, in the conventional keyboard matrix scanning method, the X-port is dedicated to serve as an input port while the Y-port is dedicated to serve as an output port. Thus, a third party can easily sense a pair of output and input scanning lines which are both at a low logic level, and knows the cross point and its corresponding key being pressed, by means of wires connected from the outside to each line and a detection to the level thereof. Thus, a user password can be obtained by a third party for illegal operations including cash withdrawals or accessing classified information.

SUMMARY OF THE INVENTION

In view of the above, an object of the invention is to provide a security keyboard matrix scanning method which is utilized in a password identification device and can efficiently prevent a third party from obtaining a user's password or detecting the keys being pressed.

To achieve the above object, a security keyboard matrix scanning method for a keyboard in accordance with this invention utilizes bi-directional input/output ports, in which each line of the X-port and the Y-port can be selectively designated as a sensing line or an output line, to construct the X-port and Y-port such that at least one line of any one of the two ports can output a scanning signal representative of a dummy scanning signal at the time the actual scanning signal is output from another line of any one of the two ports.

In a further embodiment, the security keyboard matrix scanning method of the invention is characterized in that when at least one scanning line of the X-port functions as a sensing line for inputting at least one scanning signal output from the Y-port, at least one of the other scanning lines of the X-port functions as an output line and synchronously outputs an scanning signal serving as an interference signal or a dummy signal.

By specifying at least one scanning line of the X-port and the Y-port to output an interference signal, there will be many keys locations detected to have been pressed. The actual key being pressed could not be detected even though the scanning lines are illegally connected to the outside. As a result, it can efficiently prevent a third party from detecting the key being pressed for illegal use. Thus, the security level of the password identification device is greatly enhanced.

The invention will become more fully understood from the detailed description given hereinbelow and the accompanying drawings which are given by way of illustration only, and thus do not limit the present invention.

DETAILED DESCRIPTION OF THE PREFERRED EMBODIMENTS

Figure 1:
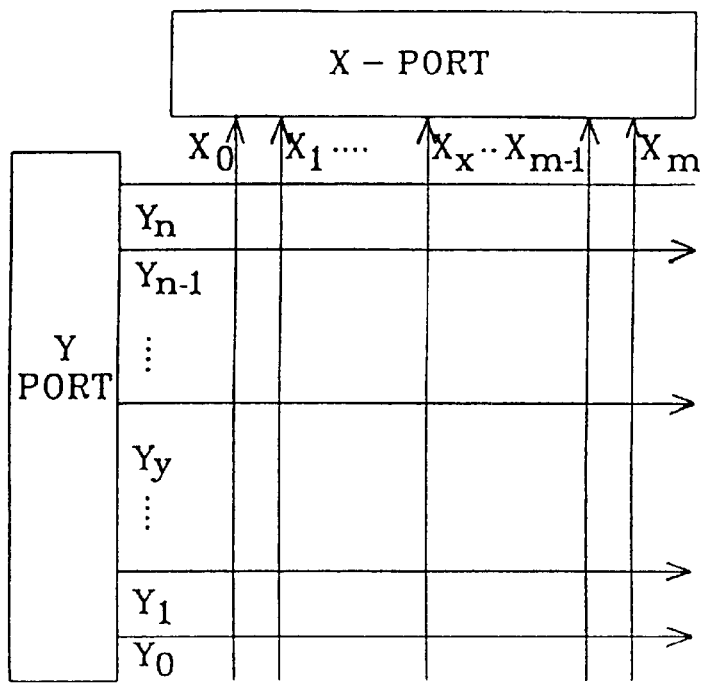
FIG. 1 is a schematic circuit diagram illustrating a conventional keyboard matrix scanning structure.
Figure 2:
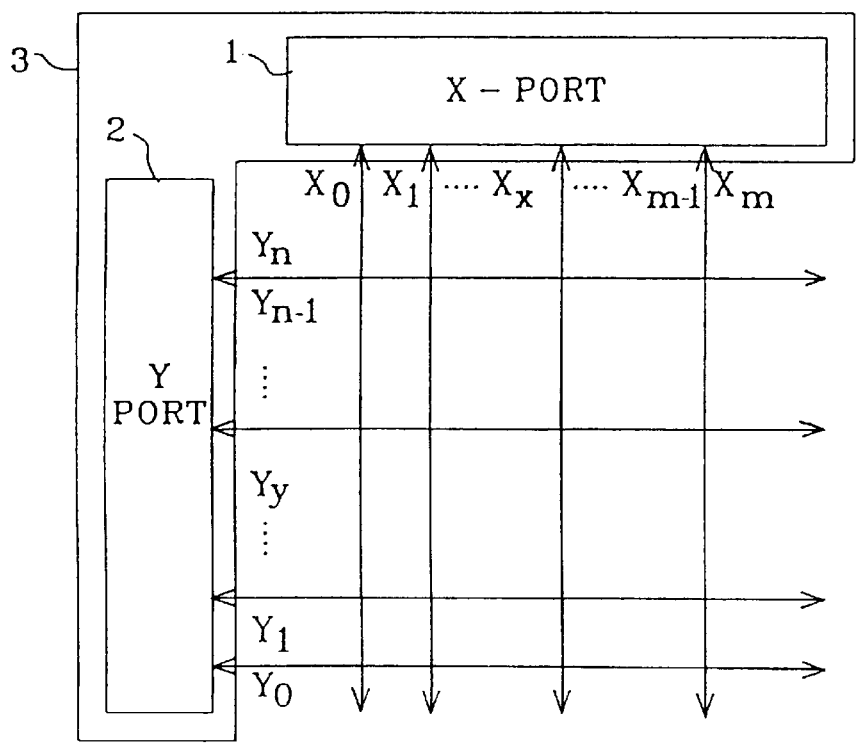
FIG. 2 is a schematic circuit diagram illustrating a security keyboard matrix scanning structure according to this invention.

FIG. 2 is a schematic circuit diagram illustrating a security keyboard matrix scanning structure used in the scanning method according to this invention. Basically, the structure used in this invention is similar to that used in the prior art as shown in FIG. 1 except the X-port and the Y-port which are bi-directional I/O ports. In other words, the arrangement of the keys used in this invention is the same as that disclosed in the conventional method. Each cross point represents a position on which one key is located. When a key is pressed, an electric conduction is formed at a corresponding cross point. The bi-directional I/O Y-port 2 has n I/O lines Y0~Yn and the bi-directional I/O X-port 1 has m I/O lines X0~Xm. Each I/O line of the bi-directional I/O X-port 1 and the bi-directional I/O Y-port 2 is controlled by the microprocessor 3 for outputting or sensing scanning signals.

The main concept of this invention is that the bi-directional I/O Y-port 2 can be selected as an output port or a sensing port at random. Relatively, the bi-directional I/O X-port 1 can be selected as a sensing port or an output port. As a result, an illegal detection can be interfered with by outputting a proper scanning signal to serve as an interference signal, thereby protecting a user's password from being illegally acknowledged. The detailed description of a security keyboard matrix scanning method according to a first embodiment of the invention is shown in FIG. 3.

Figure 3:
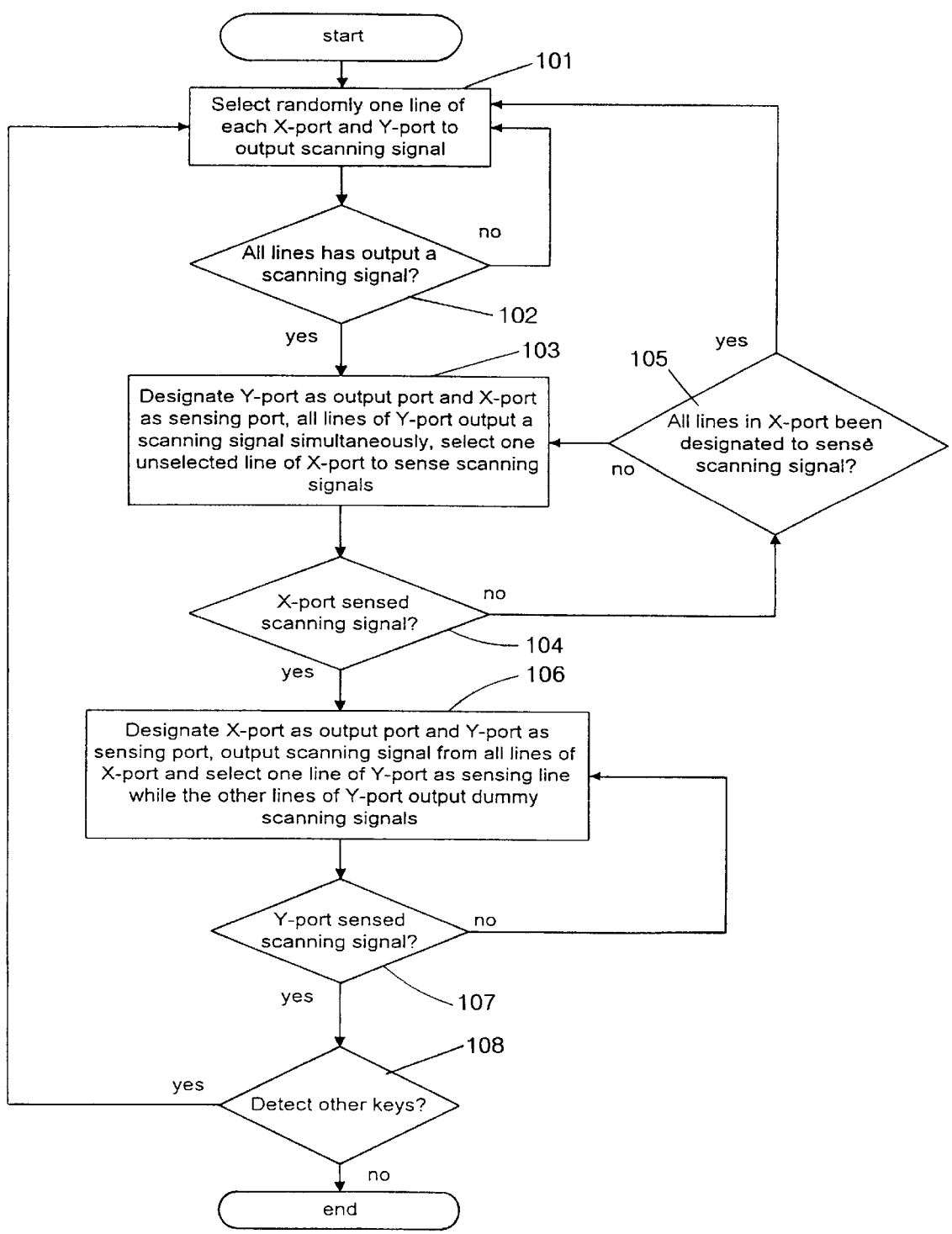
FIG. 3 is a flow chart illustrating a security keyboard matrix scanning method according to a first embodiment of the invention.

Referring to FIG. 3, as a first stage, after starting scanning/detecting, step 101 is first implemented. In step 101, both the X-port and the Y-port are designated as output ports and from each port, one output line is selected at random to output a low-logic level scanning signal while the other output lines still output a high-logic level signal. In other words, the X-port and the Y-port simultaneously output a scanning signal which functions as a dummy signal to interfere with any illegal detection attempts. Then, step 102 is implemented to determine whether or not all lines of the X-port and the Y-port has already output a scanning signal. If yes, the next step 103 to enter a second stage is implemented for actual detecting. If no, the procedure goes back to step 101 in which any one unselected line of the X-port and the Y-port is set to output a scanning signal. The above mentioned flow will continue until each line of the X-port and the Y-port have been selected to output a scanning signal. That is, each line of both the X-port and the Y-port outputs a scanning signal serving as a dummy signal in random sequence in this interference procedure.

In step 103 of the second stage, the Y-port is designated as an output port, and all of the lines Y0~Yn thereof simultaneously output scanning signals. In the meanwhile, the X-port is designated as a sensing port, and one of the sensing lines Xx (x=0, 1, 2, . . . , m) thereof is selected to sense a respective scanning signal. Thereafter, step 104 is implemented. In step 104, whether the sensing line Xx (x=0, 1, 2, . . . , m) receives a scanning signal, due to an electric conduction of its corresponding lines caused by a corresponding key $K_{xy}$, is determined. If no, step 105 is implemented to determine whether all sensing lines X0~X of the X-port has been selected for sensing, that is, whether a cycle of scanning in the X-port for each line is completed. If no, the procedure proceeds to step 103 to select another unselected sensing line for sensing. If yes, the procedure proceeds to step 101 to perform the above interference procedure and to wait for any other key to be pressed. On the contrary, if the sensing line Xx has detected a low-logic level scanning signal, its location is recorded, and the procedure proceeds to step 106 of a third stage for further identification.

In other words, if a key $K_{xy}$ is pressed in the second stage, the sensing line Xx will detect a low-logic level scanning signal. At the same time, since all of the lines in the Y-port output low-logic level scanning signals, a third part or intruder would be difficult to detect the line Yy (y=0,1,2, . . . ,n) of the Y-port on which the key is pressed, even though the line Xx corresponding to the key being pressed is known. Thus, the key $K_{xy}$ being pressed can still be prevented from being illegally acknowledged.

Subsequently, the third stage is implemented. As shown in step 106, the X-port is changed to serve as an output port, and all of the lines in the X-port output low-logic level scanning signal simultaneously. At the same time, the Y-port is changed to mainly serve as a sensing port to selectively output at least one scanning signal simultaneously. In detail, at least one line Yy (y=0,1,2, . . . or n) of the Y-port is selected as a sensing line at random while the other unselected lines such as Y0~Yy−1 and Yy+1~Yn thereof output low-logic level scanning signals. After that, step 107 determines whether the designated sensing line Yy of the Y port receives a scanning signal output from the X-port. If no, the procedure proceeds to step 106 to select another line Yy* to serve as a sensing line, and repeats the selecting procedure until one sensing line has received the scanning signal. If yes, a recognition of a key is finished and the procedure proceeds to step 108 to determine whether another key needs to be recognized. Since the purpose of the third stage is to execute a further identification for the second stage in which a key being pressed is determined, there must be a sensing line which can detect a scanning signal in step 107. In step 108, if it is unnecessary to detect another key, the entire scanning is halted. On the contrary, if there is at least one key needing to be detected, the procedure proceeds to step 101 of the first stage to await the next key to be pressed.

As the manner described above, all of the lines in the Y-port will be selected as sensing lines one by one or one group by one group. When any one line Yy, serving as a sensing line, detects a scanning signal output from the X-port, due to an electric conduction constructed by a corresponding key $K_{xy}$ being pressed, the location of the pressed key $K_{xy}$ could be determined in light of referring to the Xx line which is determined previously. In this stage, moreover, since there would be at least two lines of the Y-port are at a low logic level, a third party would not be aware of which key is pressed.

Figure 4:
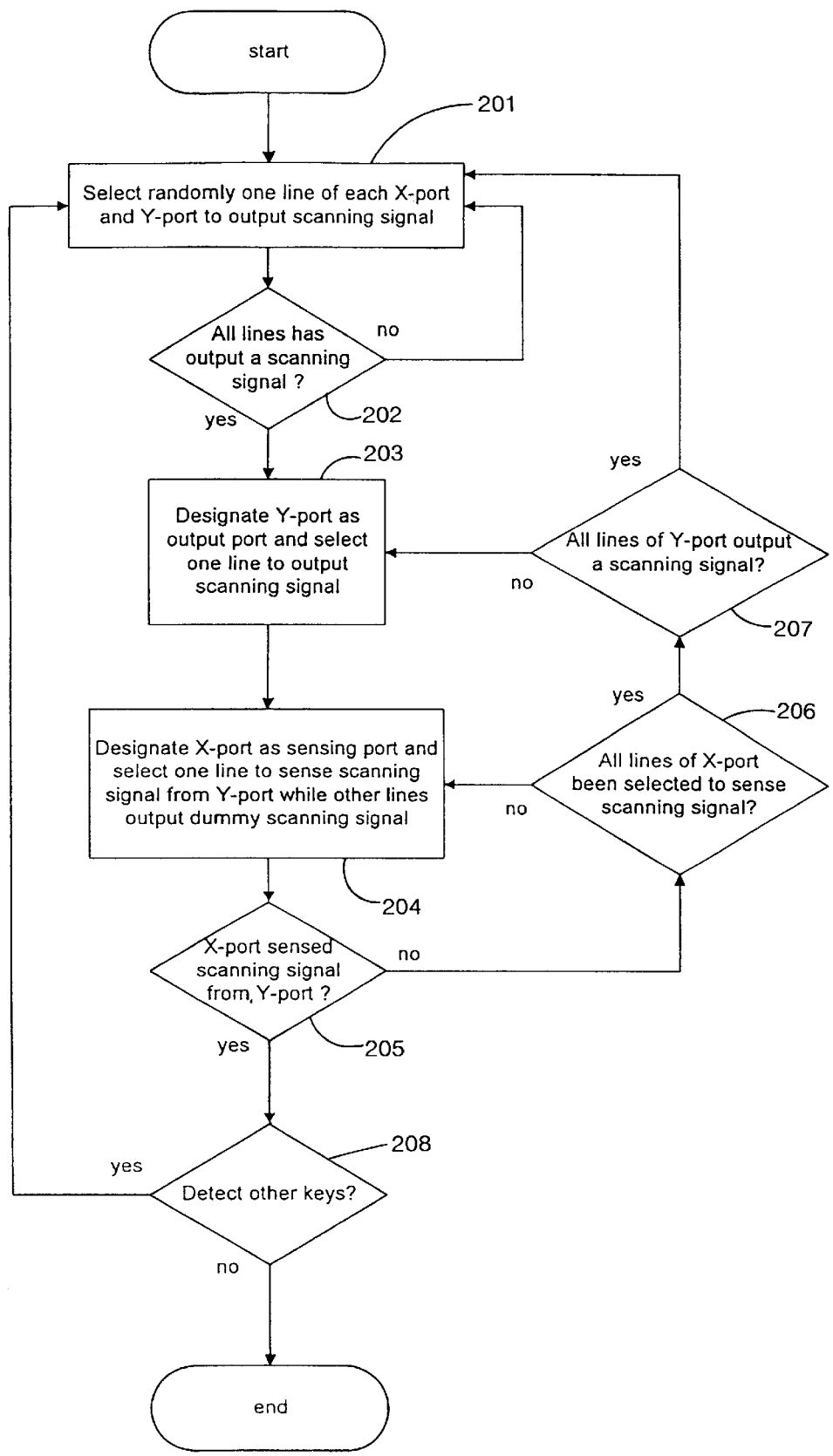
FIG. 4 is a flow chart illustrating a security keyboard matrix scanning method according to a second embodiment of the invention.

FIG. 4 is a flow chart illustrating a security keyboard matrix scanning method according to a second embodiment of the invention. Basically, steps 201 and 202 are the same as steps 101 and 102 of the first embodiment, and this is omitted here. That is, the first stage in this embodiment is also used for interfering illegal detection.

Next to step 202, a procedure for key detection and identification is implemented. In step 203, the Y-port is designated as an output port, and one line Yy (y=0, 1, 2, . . . , n) thereof is selected to output a scanning signal. Then, step 204 is implemented. In step 204, the X-port is mainly designated as a sensing port. However, as described in step 106 of the first embodiment for the Y-port, one line of the X port is set as a sensing line while the other lines thereof are set as output lines which simultaneously output scanning signals. That is, one line Xx (x=0,1, 2, . . . , m) of the X-port is selected at random to serve as a sensing line while the other unselected lines, such as X0~Xx−1 and Xx+1~Xm, each outputs a low-logic level scanning signal.

Thereafter, step 205 determines whether the scanning signal output from the Y-port is received by the line Xx due to the corresponding key $K_{xy}$ being pressed. If no, step 206 is implemented to determine whether each line of the X-port has been respectively selected to serve as a sensing line. If no in step 206, the procedure proceeds to step 204 to select another line, such as a line Xx+1, of the X-port to serve as a sensing line. Then, repeating steps 204, 205, and 206 circularly until all lines of the X-port has been selected to serve as a sensing line. If yes in step 206, step 207 is performed to determine whether all lines of the Y-port has respectively output a scanning signal. If no, the procedure proceeds to step 203 to select another line, such as Yy+1, of the Y-port to output a scanning signal, and repeats the following steps as mentioned above until the lines of the X-port and the Y-port all have been selected. If no pressed key is detected at all, the procedure proceeds back to step 201 to repeat the above-mentioned detecting interference and key detection.

On the contrary, if any line Xx of the X-port detects a scanning signal in step 205, the key being pressed would be recognized by virtue of referring to its currently corresponding X line and Y line. Then, step 208 is executed to determine whether another key will be detected. If no, the scanning is halted. If yes, the procedure proceeds back to step 201 to repeat detecting interference and key detection.

As mentioned above, password identification in the second embodiment is not executed with two stages, and one of the two ports outputs only one low-logic level scanning signal at the same time. However, since the other port has a plurality of lines being set at a low logic level, a third party would not be able to recognize the actual line to which the key being pressed corresponds.

Furthermore, a duration of pressing a key is usually more than 500 ms, and the completion of any one of the above stages does not take more than 50 ms. Therefore, a security keyboard matrix scanning method of the invention has enough time to detect each key being pressed.

In summary, a security keyboard matrix scanning method disclosed in this invention has the function to interfere the illegal key detection, and thus can efficiently prevent a password from being recognized by a third party or intruder.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. For example, which one of the X-port and the Y-port serves as a scanning port is optional. Additionally, the object of the invention can also be achieved without performing interference course in steps 101, 102, 201 and 202. Moreover, in the second embodiment, the change of another sensing line of the X-port can be performed until each line of the Y-port has output a scanning signal. Briefly, by virtue of constructing the X-port and the Y-port with bi-directional I/O ports, any one line thereof could be optionally selected for outputting or sensing a scanning signal, resulting in a variety of scanning approaches, such that a dummy/interference signal can be sent out to interfere with an illegal password detection. Therefore, the scope of the appended claims should be limited according the broadest interpretation so as to encompass all such modifications and similar arrangements.

What is claimed is:

1. A security keyboard matrix scanning method for a keyboard in which each key is located on a respective cross point of a matrix formed by two set of lines respectively belonging to a X-port and a Y-port, each pressed key being detected by means of its corresponding matrix lines on which it is located, said method comprising:
   randomly selecting each line of the X-port and/or of the Y-port to output a scanning signal;
   outputting scanning signals simultaneously from lines of the Y-port and setting each line of the X-port to sense if a key is pressed; and
   outputting scanning signals simultaneously from lines of the X-port and setting each line of the Y-port to sense which key is pressed.

2. The security keyboard matrix scanning method as defined in claim 1, wherein when one of the lines of the X-port is designated as a sensing line for sensing the actual scanning signal output from the Y-port, at least one of the other lines of the X-port is designated as an output line to simultaneously output the dummy scanning signal.

3. The security keyboard matrix scanning method as defined in claim 1 or 2, wherein all lines of the X-port and/or the Y-port respectively output the dummy scanning signals at random before one of the lines in the X-port or Y-port is designated as a sensing line.

4. The security keyboard matrix scanning method as defined in claim 2, further comprising:
   simultaneously outputting the scanning signals which includes at least one dummy scanning signal and one actual scanning from several lines of the Y-port, and setting any one line of the X-port as sensing line to individually sense the scanning signals, thereby recognizing a corresponding line of the X-port to which the key being pressed corresponds; and
   outputting scanning signals which includes at least one dummy scanning signal and one actual scanning signal from several lines of the X-port, and setting any one line of the Y-port as sensing line to individually sense the scanning signals, thereby recognizing a corresponding line of the Y-port on which the key being pressed corresponds.

5. The security keyboard matrix scanning method as defined in claim 4, wherein at least one another line of the Y-port outputs a dummy scanning signal at the time the scanning signal is output from the X-port.

6. The security keyboard matrix scanning method as defined in claim 2, wherein the actual scanning signal is output from another line of the Y-port after all the lines of the X-port has been designated as a sensing line.

7. The security keyboard matrix scanning method as defined in claim 2, wherein the change of designating the sensing line of the X-port to another line thereof is executed after all the lines in the Y port has output a scanning signal alternatively.

* * * * *